United States Patent
Zhao et al.

(10) Patent No.: US 7,187,809 B2
(45) Date of Patent: Mar. 6, 2007

(54) METHOD AND APPARATUS FOR ALIGNING VIDEO TO THREE-DIMENSIONAL POINT CLOUDS

(75) Inventors: Wenyi Zhao, Somerset, NJ (US);
David Nister, Lexington, KY (US);
Stephen Charles Hsu, Sunnyvale, CA (US)

(73) Assignee: Sarnoff Corporation, Princeton, NJ (US)

( * ) Notice: Subject to any disclaimer, the term of this patent is extended or adjusted under 35 U.S.C. 154(b) by 88 days.

(21) Appl. No.: 11/149,956

(22) Filed: Jun. 10, 2005

(65) Prior Publication Data
US 2007/0031064 A1  Feb. 8, 2007

Related U.S. Application Data

(60) Provisional application No. 60/578,734, filed on Jun. 10, 2004.

(51) Int. Cl.
*G06K 9/36* (2006.01)

(52) U.S. Cl. ...................................... 382/285; 382/294

(58) Field of Classification Search ........ 382/284–285,
382/294, 154, 190, 164, 162, 100, 276, 118,
382/103, 107; 345/419–420; 348/14.1–14.16;
356/602–611, 388–390
See application file for complete search history.

(56) References Cited

U.S. PATENT DOCUMENTS

| 5,963,664 | A | 10/1999 | Kumar |
| 6,639,594 | B2 | 10/2003 | Zhang et al. |
| 6,771,303 | B2 * | 8/2004 | Zhang et al. ............. 348/14.16 |
| 6,807,290 | B2 * | 10/2004 | Liu et al. .................... 382/118 |

OTHER PUBLICATIONS

Hsu et al., Automatic registration and visualization of occluded targets using ladar data, SPIE Laser Radar Technology and Applications VIII, vol. 5086, Apr. 2003, pp. 2-13.*

Pighin et al., Synthesizing realistic facial expressions from photographs, SIGGRAPH, ACM Press, ISBN 0-89791-999-9, 1998 pp. 75-84.*

Zhao et al., Alignment of continous video onto 3D point clouds, IEEE 1063—6919/04, pp. 1-7.*

* cited by examiner

*Primary Examiner*—Ishrat Sherali
(74) *Attorney, Agent, or Firm*—Lowenstein Sandler P.C.

(57) ABSTRACT

A method and apparatus for performing two-dimensional video alignment onto three-dimensional point clouds. The system recovers camera pose from camera video, determines a depth map, converts the depth map to a Euclidean video point cloud, and registers two-dimensional video to the three-dimensional point clouds.

18 Claims, 6 Drawing Sheets

METHOD AND APPARATUS FOR ALIGNING VIDEO TO THREE-DIMENSIONAL POINT CLOUDS

CROSS-REFERENCE TO RELATED APPLICATIONS

This application claims benefit of U.S. provisional patent application Ser. No. 60/578,734, filed Jun. 10, 2004, which is herein incorporated by reference.

GOVERNMENT RIGHTS IN THIS INVENTION

This invention was made with U.S. government support under contract number F33615-02-C-1265, DARPA. The U.S. government has certain rights in this invention.

BACKGROUND OF THE INVENTION

1. Field of the Invention

Embodiments of the present invention generally relate to an improved method for performing video processing and, more particularly, the invention relates to a method and apparatus for aligning video to three-dimensional (3D) point clouds.

2. Description of the Related Art

In modern three-dimensional processing systems there is a need for providing a three-dimensional framework onto which two-dimensional video can be applied. Such a framework is important to providing context to the viewer of the two-dimensional video. For example, registering two-dimensional images onto a three-dimensional model of a scene has been recognized as an important step in many security applications including three-dimensional modeling of urban environments. In such models, three-dimensional geometry and photometric information of the real world are recovered and registered to form virtual environments where realistic synthetic views of existing scenes are created from a sparse set of still photographs. The goal of these applications is to quickly build photorealistic three-dimensional models with correct geometry. Existing approaches to building such a model mainly have three separate steps: 1) Build a three-dimensional model using data from a three-dimensional sensor; 2) Align two-dimensional images onto the three-dimensional model; and 3) Texture the three-dimensional model using aligned video images.

To use real images as texture of a model, alignment of video onto a given three-dimensional scene is used to determine the pose of each video frame with respect to the scene. Camera pose can be established by several well-known methods.

In one method, physical measurements are used to determine the camera's location and orientation. Such physical measurements are provided by a global positioning system (GPS) receiver and/or inertial sensors (INS) that are co-located with a moving video camera. When the camera is airborne, high pose accuracy and measurement frequency can be achieved with complex and costly airborne instrumentation in conjunction with the use of ground surveys and differential GPS base-stations. Such instrumentation is usually used in aerial LIDAR acquisition. However, in many airborne video scenarios, GPS/INS-based camera pose is not continuously available for every frame and is distorted by significant outliers, biases, and drift. Thus, GPS/INS-based camera pose measurements alone are not sufficient for accurately aligning video to three-dimensional scenes. Nevertheless, they provide important approximate information to bootstrap the video based alignment for more accurate pose estimate.

In the class of two-dimensional frame to three-dimensional scene matching approaches, image appearance features such as high-contrast points and lines are matched to geometric scene features such as corners and edges. If a sufficient number of correct correspondences are identified, the pose parameters can be estimated for a frame. Most existing work for pose estimation belongs in this category.

One existing method aligns far-range video to a digital elevation map (DEM). The method first recovers three-dimensional geometry from the video by applying stereoscopic analysis on a pair of adjacent frames or adjacent images and then registering the geometry onto the DEM to obtain the camera position and heading. Based on the assumption that both the video camera and the photographic camera point downward and move in parallel to the ground, it is reasonable to represent the three-dimensional information in a two-dimensional image. This creates a compact two-dimensional representation, i.e., the so-called cliff maps that consist of edges and high curvature points. The drawback of this approach is that the reduction of full three-dimensional information to a two-dimensional cliff image limits the algorithm's capability of handling oblique three-dimensional pose.

In another example of a process to register video to a three-dimensional model, two-dimensional and three-dimensional lines are registered to align video to the three-dimensional model. In addition, a bundle adjustment can be implemented to obtain accurate pose estimation for a sequence of images. Specifically, the method first projects selected three-dimensional line segments onto an image via the current camera pose. Then, the method refines the pose by maximizing the integral of the gradient energy map (computed from the image) along the projected three dimensional line segments. In addition, three-dimensional curves/lines can be projected onto two-dimensional images as well. However, the cost function changes to the sum distance measured from the image edge points to the nearest projected curves/lines.

One common limitation of these two-dimensional to three-dimensional approaches is that they cannot handle scenes lacking easily extracted lines and curves. In addition, it is not easy for these approaches to correct for large three-dimensional pose error due to significant occlusions. Finally, it is time consuming and sometimes difficult to obtain accurate three-dimensional lines from noisy range images since planar segmentation of range data is a prior step to line extraction.

Therefore, there is a need in the art for an improved method of performing two-dimensional data to three-dimensional data alignment/registration.

SUMMARY OF THE INVENTION

The present invention is a method of apparatus for performing two-dimensional video alignment onto a three-dimensional point cloud. The system recovers camera pose, determines a depth map, converts the depth map to a Euclidean video point cloud, and registers the video point cloud directly onto the three-dimensional point cloud.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
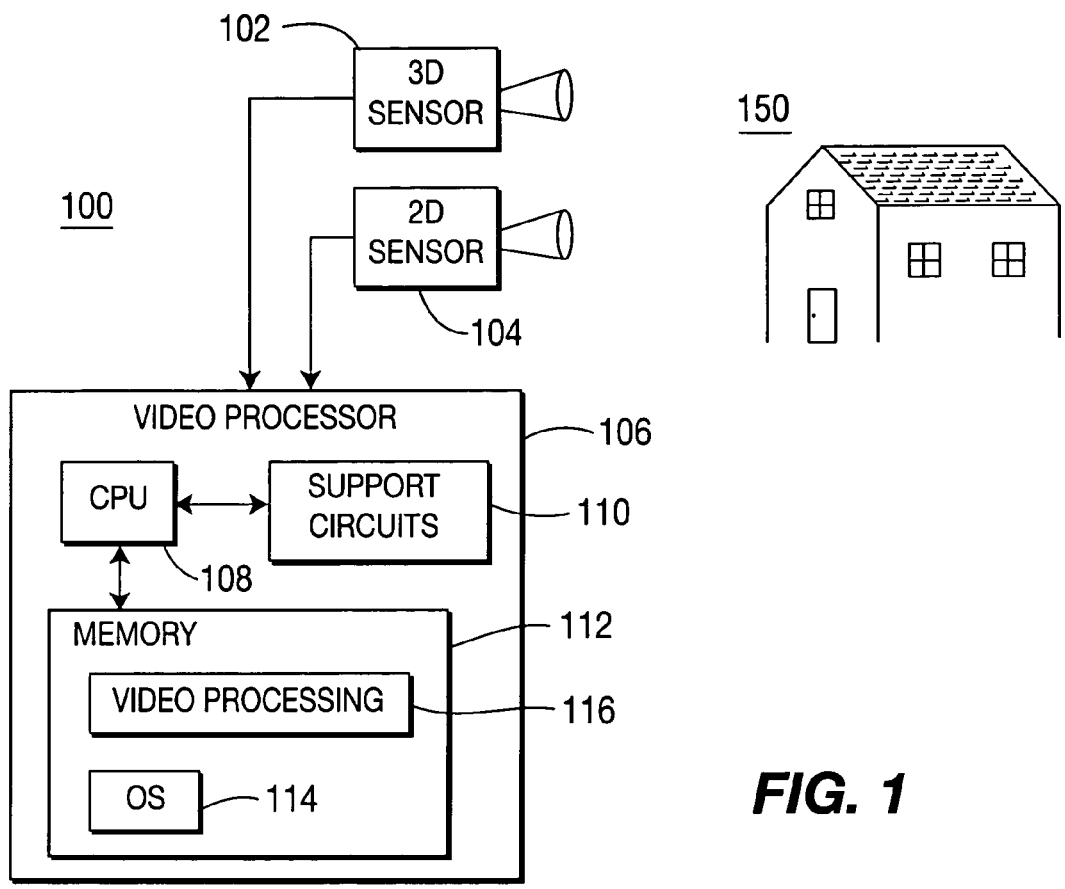
FIG. 1 is a high level block diagram of an exemplary embodiment of the present invention within a video processing system.

FIG. 1 depicts an exemplary video processing system 100 comprising a three-dimensional (3D) image sensor 102, a two-dimensional (2D) image sensor 104 and a video processor 106. The three-dimensional sensor may be a LIDAR sensor that images a scene 150 to identify the three-dimension attributes of the scene 150. The two-dimensional sensor 104 is, for example, a video camera that produces a sequence of two-dimensional images of the scene 150.

The video processor 106 comprises a central processing unit (CPU) 108, support circuits 110, and a memory 112. The CPU 108 may be one or more of any well-known microprocessors or micro-controllers. The support circuits 110 comprise well-known support circuits including one or more of cache, input-output circuits, clock circuits, power supplies and the like. The memory 112 may be one or more well-known types of memory including random access memory, read only memory, removable memory, hard-disk drive memory, optical storage and the like. The memory 112 contains software such as an operating system 114 and video processing software 116. The video processing software, when executed, performs the methods of the present invention.

Figure 2:
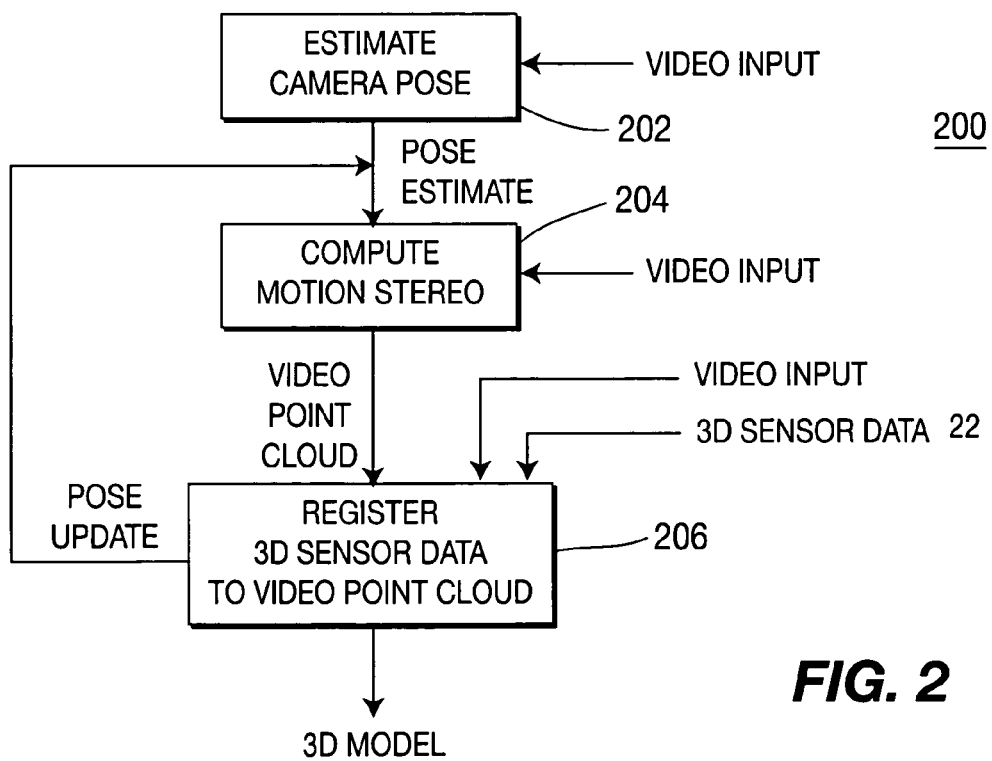
FIG. 2 is a high-level flow diagram of a process that is performed by the video processor of FIG. 1.

FIG. 2 depicts a high-level flow diagram of a method 200 of performing the video processing of the present invention. The method 200 comprises three steps for completing a two-dimensional image alignment to a three-dimensional point cloud. At step 202, the method 200 estimates camera pose; at step 204, the method 200 performs motion stereo computations to derive a three-dimensional point cloud from the two-dimensional video; and at step 206, the method 200 registers the video point cloud to the 3D sensor data. More specifically, step 202 performs the recovery of camera pose from the imagery imaged by the sensor 104. Step 204 uses motion stereo processes to recover a dense three-dimensional point cloud from the video and step 206 performs an Iterative Closest Point (ICP) registration process to register the three-dimension data from the three-dimensional sensor 102 and the two-dimensional video using the dense three-dimensional video point cloud. The result is a 3D model of the scene.

To register video frames onto three-dimensional point cloud without creating a 3D model first, a common feature should be used to perform the registration: namely, the three-dimensional geometry of the scene.

Figure 6:
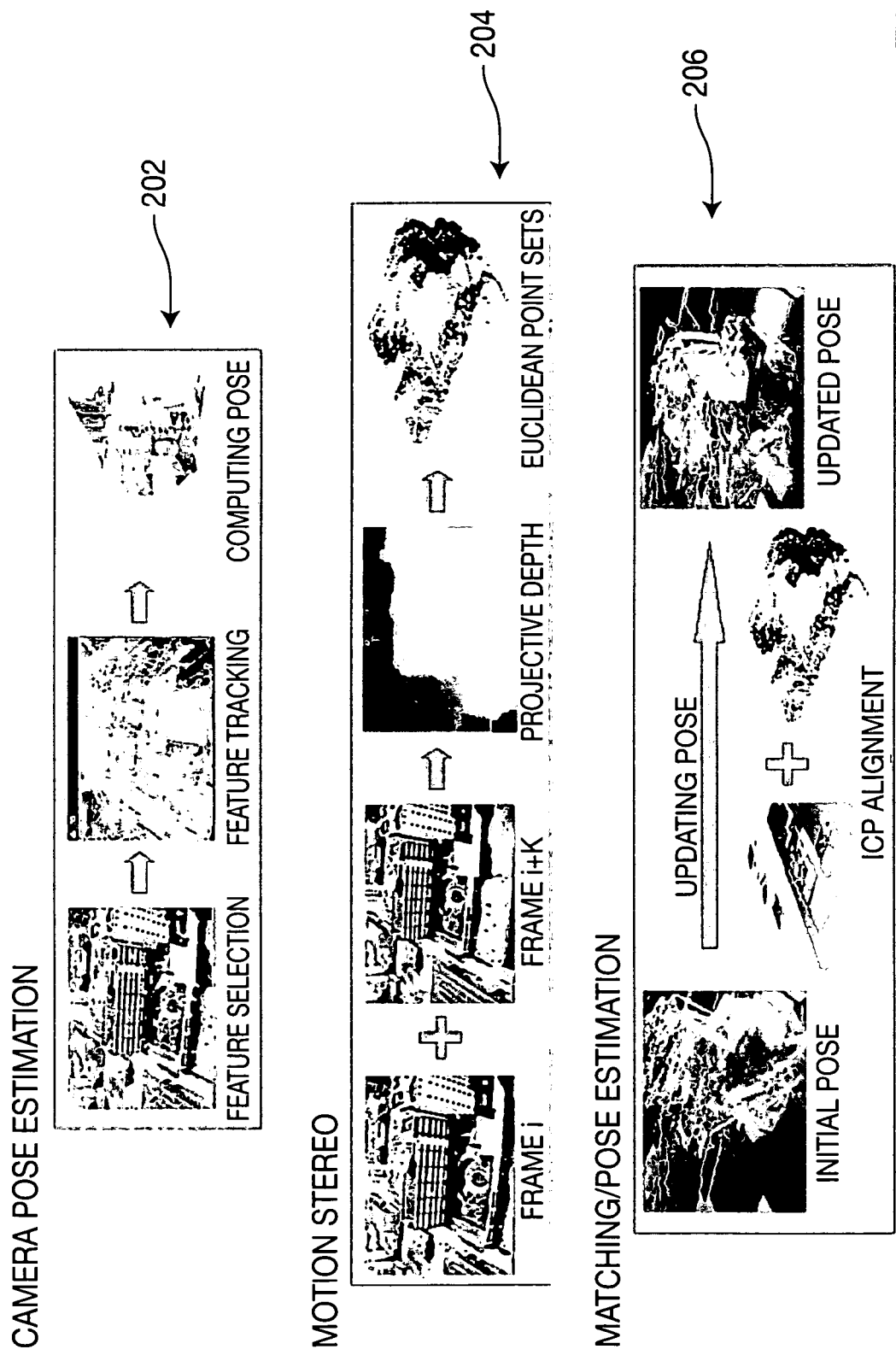
FIG. 6 depicts video frames used in the methods of FIGS. 4, 5 and 6.

FIG. 6 depicts a graphical outline of the processes of the present invention. During the camera pose estimation method, feature selection and tracking leads to a camera pose estimate. A motion stereo process is used to analyze the frames of video to determine Euclidean point cloud representations of a scene. Lastly, the three-dimensional video point cloud is matched to the three-dimensional point cloud from the 3D sensor. Registration is performed using ICP alignment. The result is used to update camera pose as well as build a 3D model of the scene.

Figure 3:
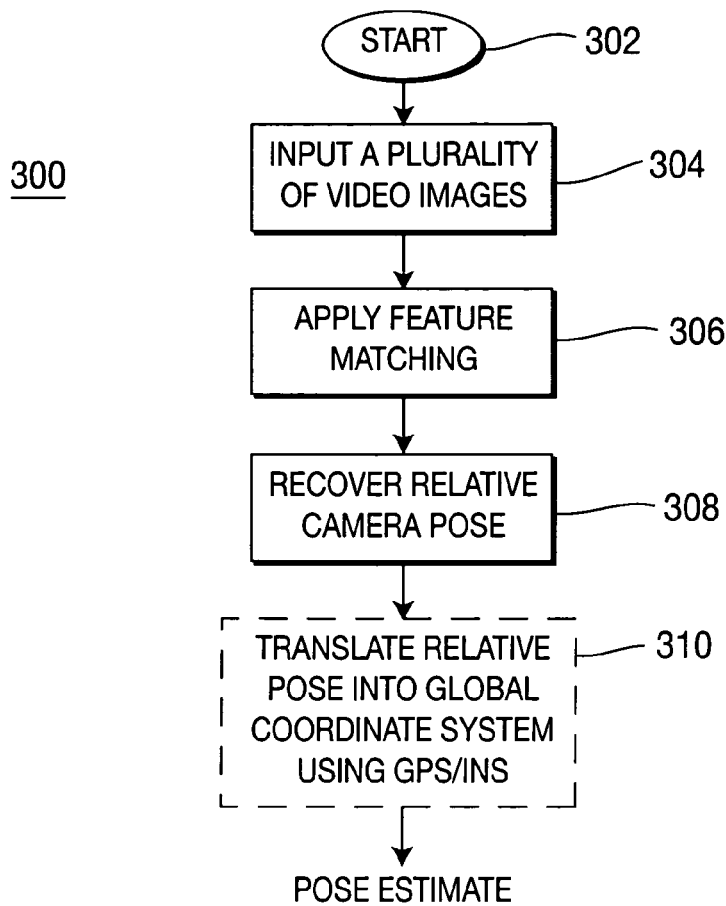
FIG. 3 is a flow diagram of one embodiment of a pose estimation method used by the present invention.

Before three-dimensional structure can be reconstructed from video, the camera pose must be estimated. FIG. 3 depicts a flow diagram of one embodiment of a method 300 for estimating camera pose. The method begins at step 302 and proceeds to step 304, where 2D images from the video sensor are input. The camera pose can be expressed using a three by four camera matrix p, which can be further decomposed into extrinsic and intrinsic camera parameters as follows:

$$p = KW = K[R|T], \quad (1)$$

where K is the intrinsic 3 by 3 calibration matrix, W is the extrinsic orientation matrix where R is the extrinsic rotation matrix (3 by 3), and T is the translation vector (3 by 1). Each of these parameters needs to be determined for each frame of the video.

The most favorable case of pose estimation is when the K matrix is known; for example, through the use of a calibration procedure. A calibration procedure may include calibration from two video frames where 3D information of image features (points/lines) are known. In cases where K is unknown, K can be estimated. However, this is less stable than pose estimation with an efficient use of a known K.

The invention uses a well-known real-time method for pose estimation where the intrinsic parameters of the camera, such as focal length, are assumed to be known a priori. Specifically, the method uses an efficient algorithmic solution to the classical five-point relative pose problem. At step 306, feature point matches are extracted for consecutive images pairs using appearance based matching. A robust hypothesis and test scheme based on a fast version of a RANSAC is used to estimate the best relative pose. To reduce the ambiguity of motion estimation, more than two views are used.

Given the camera poses p and p' of two video frames, at step 308, the method 300 performs triangulation to determine the three-dimension position X corresponding to matching points x and x'. However, only the relative positions of the three-dimensional points and cameras can be recovered from images. The local and global Euclidean coordinate systems are related by 4 by 4 similarity matrix.

$$H = \begin{bmatrix} sR & T \\ 000 & 1 \end{bmatrix}, \quad (2)$$

where s, R, and T represent scale, rotation, and translation, respectively. If the image processing system has available GPS/INS, the method 300 at step 310 can obtain the absolute camera positions in the global coordinate system. The output of method 300 is an estimate of the camera pose. During additional processing in FIG. 5, the camera pose can also be updated using information taken from the three-dimensional scene.

Figure 4:
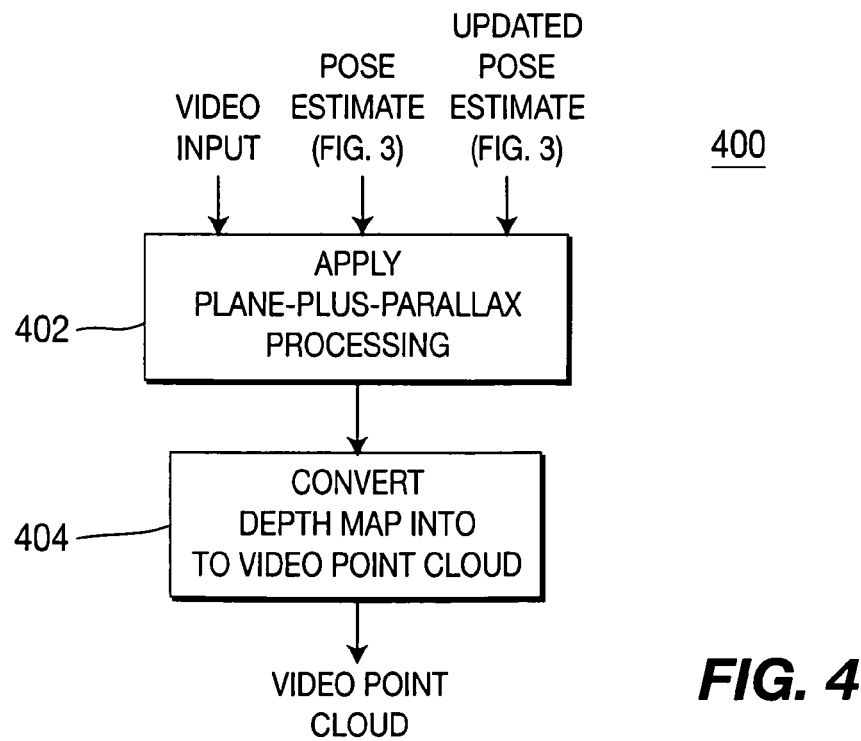
FIG. 4 is a flow diagram of one embodiment of a motion stereo method used by the present invention.

FIG. 4 depicts one embodiment of a method 400 of performing a motion stereo computation. Given a camera pose estimate, a motion stereo method 400 attempts to recover dense three-dimensional information for an entire field of view from the two-dimensional video frames. Such a method typically relies on correlation of corresponding small image regions between frame pairs. To prevent erroneous three-dimensional reconstruction, areas with low confidence can be discarded, resulting in less than 100 percent dense three-dimensional reconstruction. Though earlier stereo methods depended on a parallel/non-convergent camera configuration, imagery from non-parallel camera configurations can be rectified by using the estimated camera poses. One method of performing motion stereo processing is the plane-plus-parallax framework, disclosed in U.S. Pat. No. 5,963,664 issued Oct. 5, 1999 which is used to compute a depth map of a scene. Combining this method with the so-called direct methods that work directly on images, a method for recovering three-dimensional information can be efficiently implemented in a multi-resolution paradigm. Though there exist more elaborate methods for three-dimensional construction at step 402, the plane-plus-parallax method is used in order to have an efficient framework for generating a depth map from a video sequence.

To convert the depth map into a point cloud, the method 400, at step 404, converts each pixel in the depth map into a three-dimensional point using the camera matrix (i.e., pose estimate). Note that this point cloud is in a local Euclidean coordinate system and needs to be converted into a global point cloud via multiplying the similarity matrix H for matching against the global three-dimensional sensor data. After the matching, the similarity matrix H and the absolute camera pose will be updated.

Registration of raw three-dimensional point clouds offers the most flexible and applicable method for two-dimensional to three-dimensional alignment. For example, all three-dimensional data, including the three dimensional model, can be represented as a raw point cloud. The use of a point cloud offers an opportunity for fusing three-dimensional information from both the three-dimensional sensor and video sensor to build a final three-dimensional model that is textured with video.

Figure 5:
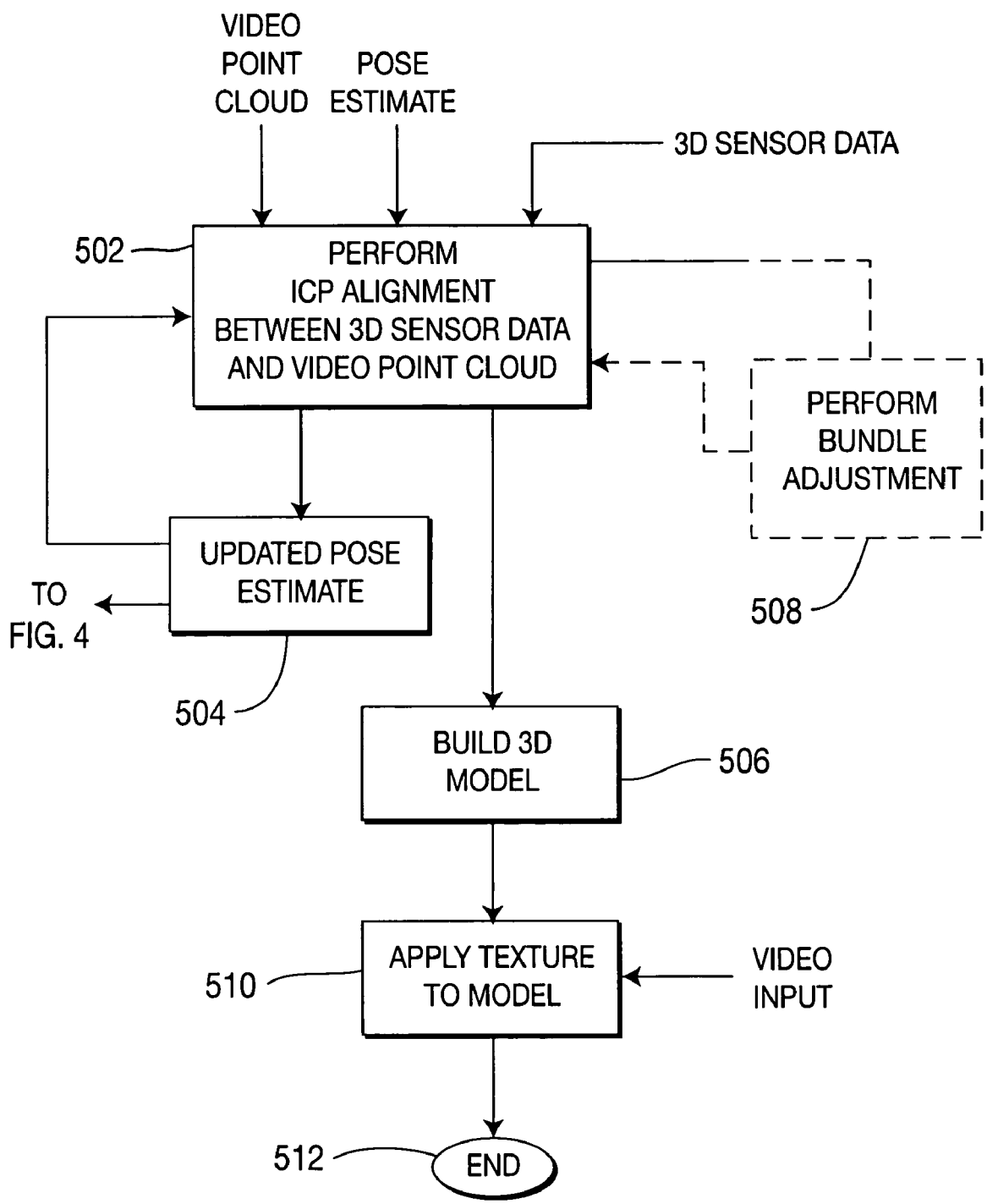
FIG. 5 is a flow diagram of one embodiment of a point cloud matching method used by the present invention.

FIG. 5 depicts a flow diagram of a method 500 for registering the 3D sensor data to the 3D video point cloud created in the method 400 of FIG. 4. At step 502, the 3D sensor data (i.e., a point cloud) is aligned with the video point cloud of method 400. The alignment information can be used in step 504 to update the camera pose estimate and, as in step 506, to generate a 3D model of the scene. At step 510, the model is textured with the video. The method 500 ends at step 512.

An Iterative Closest Point (ICP) registration is a popular algorithm for matching point clouds with unknown matching point pairs. There are many variations of this algorithm, but the basic version of ICP consists of iterating the following two steps: 1) selecting point pairs by finding the closest points and 2) computing the best transformation between all chosen point pairs. The closest point pairs can be found via an efficient KD-tree algorithm. In the motion-updating step, the three-dimensional transformation H between the two match point sets can be efficiently updated using a closed form formula. One key parameter of the ICP algorithm is the distance threshold $d_T$ or finding closest points. To have a stable ICP, the invention should employ a varying $d_T$ that decreases at each iteration i. In experiments using real data, the initial positions of the video point clouds are tens of meters away from the three-dimensional sensor point cloud. To increase the capture range of ICP, the invention employs the following two-step strategy for motion updating:

First, update the translation T using a large distance threshold $d_T$ for starting the first round of iterations For example, a value of about thirty-five meters is used in one set of experiments Then, update the full transformation H using a smaller $d_T$ for starting the final round of iterations For example, a value of about five meters is used in the same set of experiments.

The rationale of this two-step approach is the fact that a rotation estimate is much more accurate than a translation estimate during camera pose recovery.

After ICP alignment, at step 504, the method 500 finally updates the absolute camera pose. Recall that the absolute camera pose can be obtained from recovered camera pose p via the similarity matrix H. After ICP alignment, an updated similarity matrix H can be obtained, yielding the updated absolute camera pose.

$$P=p(H)^{-1}=K[R|T](H)^{-1} \qquad (3)$$

There are certain parameters in using the ICP implementation that are considered, including 1) tolerance threshold $t_T$ used in building approximate nearest neighbor KD-trees from point clouds, (2) distance threshold $d_T$ used in finding closest points, (3) number of total iterations N and (4) number of randomly sampled points S at each iteration.

The tolerance threshold $t_T$ in building an ANN KD-tree affects the accuracy of accessing closest points. Only zero tolerance threshold guarantees that exact closest points can be found. However, experience indicates that ANN KD-trees, based on several non-zero values work well for matching. The distance threshold $d_T$ is clearly related to the capture range of the ICP algorithm. Assuming the convergence of ICP, larger $d_T$ implies larger capture range. For a decaying $d_T$, the alignment accuracy of ICP is related to the final value of $d_T$ but limited to the noise present in point clouds. To insure a stable convergence of ICP, the decay speed of $d_T$ should be limited. Based on the experiments, 50 iterations typically provide sufficient convergence with final value of $d_T$ being 1/10 to 1/5 of its initial value. For the two-step ICP alignment, the initial value of $d_T$ in Step Two ICP should be larger then the final value $d_T$ of Step One ICP. Finally, random sampling of points at each iteration is used to improve the algorithm efficiency. The experiments indicate that it is sufficient to sample 2000 points.

Though there exists many variants of the ICP algorithm, there are limitations to this algorithm. For example, it is, in general, impossible to align two planar scenes. In practice serious errors in three-dimensional reconstruction can also cause ICP to diverge. For example, when a camera is viewing small three-dimensional structures or scenes with weak geometry, reconstruction errors due to pose estimation and structure recovery could overwhelm the true three-dimensional structures in terms of the influence upon alignment. One solution to this problem is to apply a bundle adjustment (step 508) assuming some frames in the video can recover good three-dimensional structures.

One important issue in matching two point clouds is the border effect caused by border points that lie on the borders of each point cloud. Meanwhile, there are plenty of object boundaries in a scene full of objects and points from these object boundary points. In practice, border points could be boundary points or non-boundary points since frames have different viewing angles and limited fields of view. For example, overlapping image borders of video cameras are often converted to non-boundary border points through motion stereo. The existence of these non-boundary border points leads towards biased motion estimation. To eliminate such bias without automatically determining whether the border points are boundary points or not, the invention does not include any border points from two corresponding point clouds in the process of selecting closest point pairs. This way, none of the border points, especially those non-boundary points, contribute towards the motion computation.

The border effect happens as follows: first, border points $X_I$ from one point cloud A are warped to the outside of the border regions of the other point cloud B. Then, the closest points of $X_I$ from B can only be found in one direction, i.e., from the inside of the border regions of B. This is different from the normal case where the closest points would come from all directions in a region of B surrounding warped $X_I$. As a result, the motion estimation between A and B is biased towards pulling borders of A and B closer at each iteration.

Up until now the discussion has focused on using pairs of frames. This approach can be extended to compute the camera pose of a video sequence by choosing a pair of "key" frames every K frames and applying a frame alignment process.

To recover the pose of non-key frames, bundle adjustment, a standard non-linear minimization procedure used in photogrametry, is used. A bundle adjustment (e.g., a Levenberg-Marquardt algorithm) is used to enforce global consistency of the estimated camera poses based on the relative camera poses and frame alignment. As a result of the bundle adjustment, the invention cannot only interpolate the camera poses from non-key frames, but also smooth poses for key-frames.

More specifically, let $\hat{H}_{I_i}$ represent the unknown similarity transformation from camera centered local coordinate system and frame I to global coordinate and let $H_i$ be the similarity obtained by ICP frame alignment. Let $W_{i,I+K}$ represent the rigid transformation between adjacent cameras i, i+K as estimated by pose recovery let $[u_{im}]$ be a set of 3D test points in frame that lie in the vicinity of the scene structure (any three or more well distributed points will suffice). The unknown $\hat{H}_i$ is estimated by minimizing the cost function:

$$E = \sum_i E_i + \lambda \sum_i E_{i,i+K}, \quad (4)$$

where $$E_i = \sum_m |\hat{H}_i(u_{im}) - H_i(u_{im})|^2 \quad (5)$$

penalizes inconsistency with frame alignment, $$E_{i,i+K} = \sum_m |\hat{H}_i(u_{im}) - \hat{H}_{i+K}(W_{i,i+K}(u_{im}))|^2 \quad (6)$$

Inconsistency with pose recovery, and $\lambda$ is the ratio of frame alignment variance to pose recovery variance.

The invention processes video frames continuously using the following steps:
 perform frame alignment to obtain the pose $H_I$ for a currently chosen key frame, initialized with the pose cascaded from the previous key frame with frame-to-frame motions; and
 apply bundle adjustment to obtain the poses for both non-key and key frames.

One of the advantages of the proposed framework is that only close frames are used to compute the depth maps; hence, the algorithm is not very sensitive to accumulated errors of pose estimation in a long sequence.

At step 506, the method 500 uses either a traditional modeling approach that builds a geometry model from 3D sensor data or a novel modeling approach, the so-called "model through registration" approach, that fuses three-dimensional information from both the three-dimensional sensor and the video sensor to build a final three-dimensional model. At step 510, the 3D model is textured with the video texture. The process 500 ends at step 512.

Figure 7:
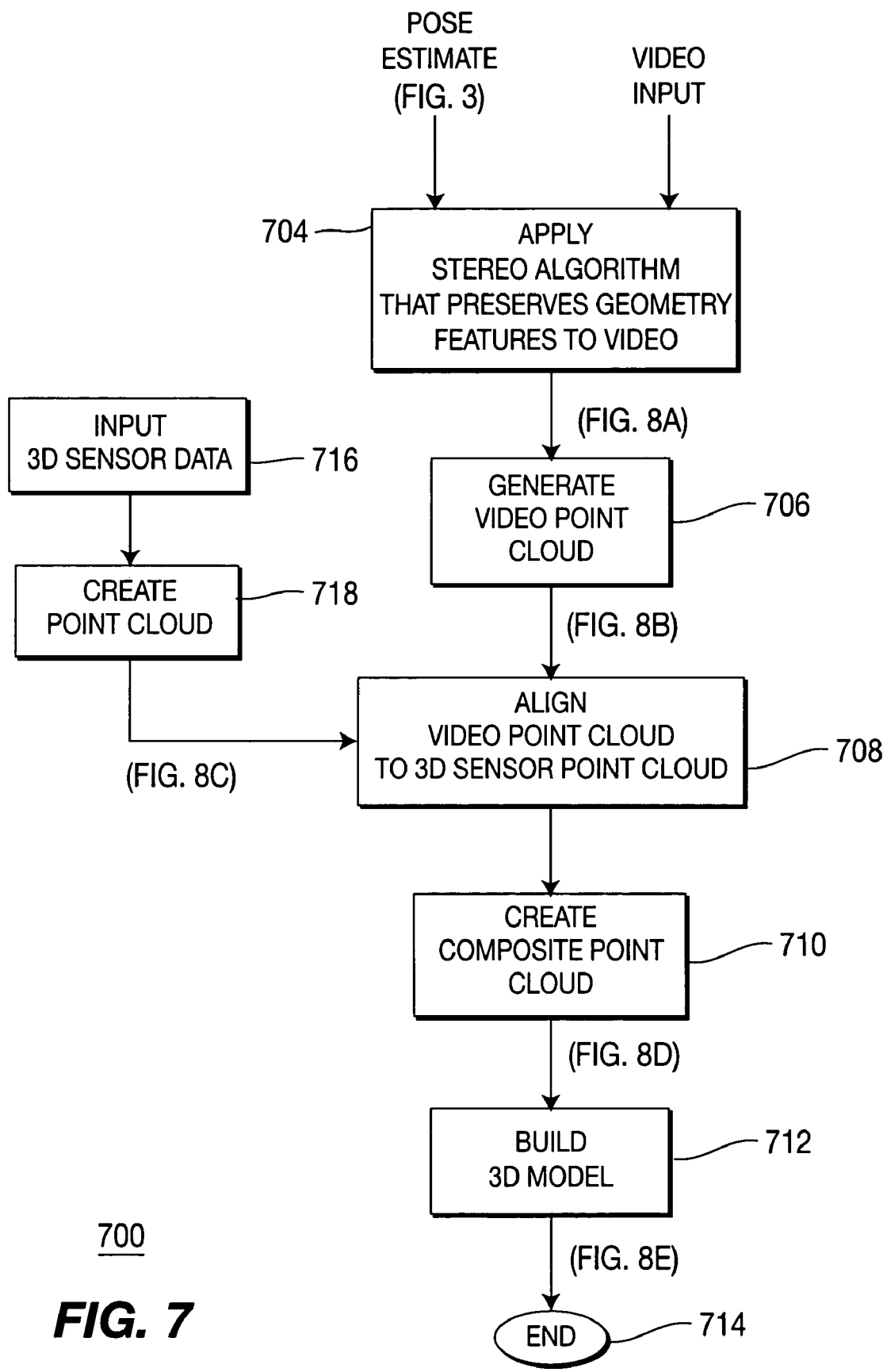
FIG. 7 depicts an alternative embodiment for creating a three-dimensional model.

Referring to FIGS. 7, 8 and 9, a real example is shown where point clouds from video and LIDAR are fused to build a model. A point cloud inferred from the camera sensor can be used to compensate for the missing information from the three-dimensional sensor data.

Figure 8A:
FIG. 8 depicts the output images at various steps of FIG. 7.
Figure 8B:
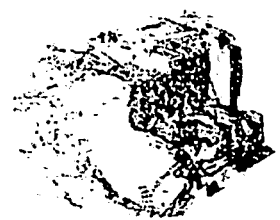
Figure 8C:
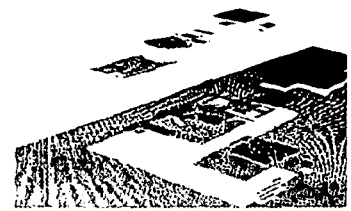
Figure 8D:
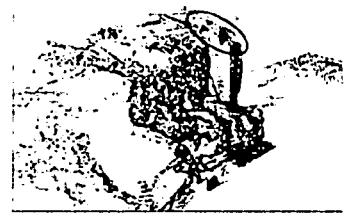
Figure 8E:
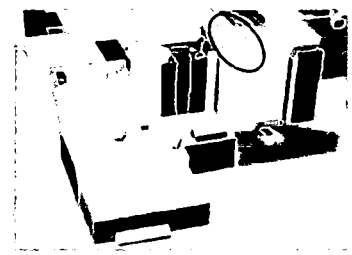

To directly utilize the three-dimensional geometry information derived from video, a high quality depth map is necessary. For example, the motion stereo point cloud based on the plane-plus-parallax framework is sufficient for ICP alignment, but the three-dimensional points are noisy and sharp edges are not well recovered. To improve the three-dimensional reconstruction of 3D geometry, the so-called modeling through registration method 700 of FIG. 7 can be applied. This approach is now possible because a three-dimensional model is not required for alignment in the proposed framework. The potential advantages of this modeling approach are two-fold, (1) missing information from the three-dimensional sensor can be complimented by the information from a video camera and, (2) dynamic modeling is possible that, for example, models new three-dimensional structures appearing in recently acquired video, but not in the 3D sensor data. The method 700 begins at step 702 and proceeds to step 704, where the method 700 applies a stereo algorithm that preserves sharp edges, for example, the well-known color segmentation-based stereo algorithm, to obtain high quality depth map (FIG. 8A). At step 706, this depth map is used to create a 3D point cloud (FIG. 8B) from the estimated depth map. The point cloud from 3D sensor is depicted in FIG. 8C. At step 708, the method 700 uses ICP to align the video inferred point cloud onto the 3D sensor point cloud, to create (at step 710) a composite point cloud (shown in FIG. 8D) and use the composite to build a 3D model interactively. The textured model is shown in FIG. 8E. The method 700 ends at step 714.

Figure 9A:
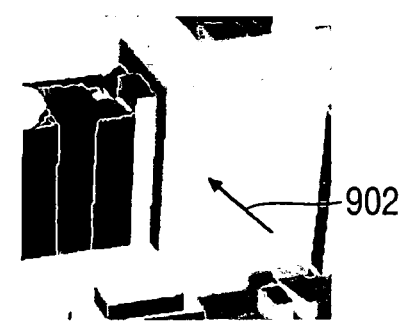
FIG. 9 depicts a comparison between a model produced in accordance with the invention and one produced using only 3D sensor data.
Figure 9B:
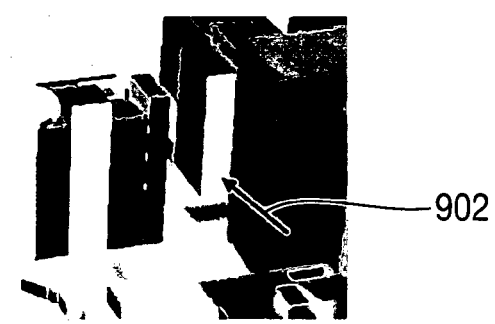
Figure 9C:
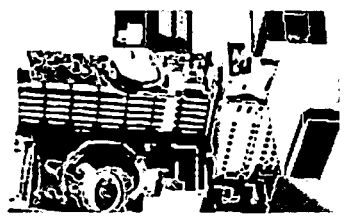
Figure 9D:
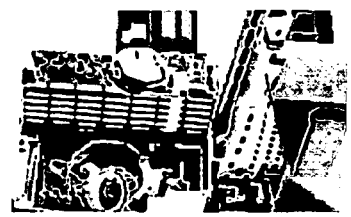

FIG. 9(A)–(D) compares the results of modeling a scene using various techniques. FIG. 9A depicts a geometry model that is constructed in accordance with the invention using both video and 3D sensors. FIG. 9B depicts a geometry model created using the 3D sensor only, where location 902 identifies missing information in the 3D sensor point cloud. The same location 902 in FIG. 9A is filled by information gleaned from the 2D video point cloud. FIG. 9C depicts the textured model of FIG. 9A with texturing applied, and FIG. 9D depicts the textured model of FIG. 9B with texturing applied. The improved geometry modeling of FIG. 9A produces a correctly textured image.

The foregoing is directed to embodiments of the present invention, other and further embodiments of the invention may be devised without departing from the basic scope thereof, and the scope thereof is determined by the claims that follow.

The invention claimed is:

1. A method of processing video comprising:
   estimating camera pose from two-dimensional video;
   computing motion stereo for the two-dimensional video using the pose estimate to create a three-dimensional video point cloud;
   registering three-dimensional sensor data to the three-dimensional video point cloud; and
   producing a three-dimensional model from the registered three-dimensional data and the video point cloud.

2. The method of claim 1 wherein the estimating step further comprises:
   applying a feature-based matching process to generate local pose in a local coordinate system;
   translating the local pose into the pose estimate within a global coordinate system.

3. The method of claim 2 further comprising translating the local pose estimate to a global coordinate system using information received from a satellite navigation system or calibration from two video frames where 3D information of image features are known.

4. The method of claim 1 wherein the motion stereo computation comprises plane-plus-parallax processing.

5. The method of claim 4 further comprising converting a depth map produced by the plane-plus-parallax processing into a point cloud.

6. The method of claim 1 the registering step further comprises:
   performing an ICP alignment.

7. The method of claim 6 wherein the registering step further comprises performing a bundle adjustment using aligned key frames within the two dimensional video.

8. The method of claim 1 wherein the motion stereo is a color segmentation stereo algorithm.

9. The method of claim 1 further comprising converting the three-dimensional sensor data into a second point cloud that is matched to the three-dimensional point cloud representing the two-dimensional video to create a composite point cloud.

10. Apparatus for processing video images comprising:
    means for estimating camera pose from two-dimensional video;
    means for computing motion stereo for the two-dimensional video using the pose estimate to create a three-dimensional point cloud;
    means for registering three-dimensional sensor data to the three-dimensional video point cloud; and
    means for producing a three-dimensional model from the matched three-dimensional data and the video point cloud.

11. The apparatus of claim 10 wherein the means for estimating further comprises:
    means for applying a feature-based matching process to generate local pose in a local coordinate system;
    means for translating the local pose into the pose estimate within a global coordinate system.

12. The apparatus of claim 11 further comprising means for translating the pose estimate using information received from a satellite navigation system or or calibration from two video frames where 3D information of image features are known.

13. The apparatus of claim 10 wherein the motion stereo computing means comprises means for performing plane-plus-parallax processing.

14. The apparatus of claim 13 further comprising means for converting a depth map produced by the means for performing plane-plus-parallax processing into a point cloud.

15. The apparatus of claim 10 the means for registering further comprises:
    means for performing an ICP alignment.

16. The apparatus of claim 15 wherein the means for registering further comprises:
    means for performing a bundle adjustment using key frames within the two dimensional video.

17. The apparatus of claim 10 wherein the motion stereo is a color segmentation stereo algorithm.

18. The apparatus of claim 10 further comprising means for converting the three-dimensional sensor data into a second point cloud that is matched to the three-dimensional point cloud representing the two-dimensional video to create a composite point cloud.

\* \* \* \* \*